United States Patent [19]

McDermott

[11] Patent Number: 4,673,008

[45] Date of Patent: Jun. 16, 1987

[54] SYSTEM FOR CHARGING CONTAINERS WITH SOLIDS SUSPENDED IN A CARRIER FLUID

[75] Inventor: Daniel J. McDermott, Export, Pa.

[73] Assignee: Westinghouse Electric Corp., Pittsburgh, Pa.

[21] Appl. No.: 765,467

[22] Filed: Aug. 14, 1985

[51] Int. Cl.⁴ .............................................. B65B 1/04
[52] U.S. Cl. .................................. 141/198; 137/266; 141/9
[58] Field of Search ...................... 141/9, 95, 96, 198; 137/266

[56] References Cited

U.S. PATENT DOCUMENTS

| | | | |
|---|---|---|---|
| 2,372,448 | 3/1945 | Porteous | 137/266 X |
| 2,372,449 | 3/1945 | Porteous et al. | 137/266 X |
| 4,266,580 | 5/1981 | Dixon | 141/198 X |

Primary Examiner—Stephen Marcus
Assistant Examiner—Mark Thronson
Attorney, Agent, or Firm—R. S. Lombard

[57] ABSTRACT

A system for continuously charging containers with a flowable substance including solid material, has a first pipe, a flow sensor for detecting substance flow in the first pipe; a plurality of valved second pipes each communicating with the first pipe and extending into a respective container; a level sensor associated with each second pipe for directly responding to a predetermined height level of the solid material accumulating in each respective container; and a control arrangement connected to the flow sensor, the level sensors and the valves of the second pipes for shutting off the valve of that second pipe through which charging was in progress and simultaneously opening the valve of another second pipe which is associated with an empty, standby container, at the moment when the level sensor associated with the container undergoing charging indicates that the solids reached the "full" level, while, at the same time, the flow sensor continues to indicate substance flow.

6 Claims, 4 Drawing Figures

SYSTEM FOR CHARGING CONTAINERS WITH SOLIDS SUSPENDED IN A CARRIER FLUID

BACKGROUND OF THE INVENTION

Field of the Invention

This invention relates to a system for charging containers with solids suspended in a carrier fluid. A particular field of application is the final disposal of contaminated resin used in a nuclear power plant for removing undesirable cations and anions from the reactor coolant or auxiliary systems. The spent resin which is of a granular, sand-like consistency, is temporarily stored in a spent resin tank from which it is transferred into drums that are subsequently sealed and shipped for final disposal.

The transfer of the resin from the spent resin tank to the drums is effected by suspending the resin in a carrier liquid to thus form a slurry which is pumped through a pipeline into the drums. The carrier liquid passes through the drums to ensure that the storage volume of each drum is utilized for the resin itself to the greatest extent possible. When the drum undergoing charging is filled to capacity, an isolation valve controlling slurry flow to that drum is closed and a second isolation valve to an empty drum is opened, whereupon the drum is sealed and removed for final disposition and the resin transfer from the spent resin tank to an empty drum resumes.

For shutting off the isolation valve at the appropriate moment to ensure, on the one hand, that the drum has been filled to capacity and to prevent resin, on the other hand, from backing up into the pipeline from the drum undergoing charging, the resin level in the drum, or at least the desired "full" level thereof has to be reliably determined. Such a resin level determination, however, has for long involved difficulties. A principal source of these difficulties is the desideratum to store resin rather than a water-resin slurry in the drum to more efficiently consume the waste disposal storage volume dedicated to resin. Conventional level instruments, such as floats and differential pressure gauges are unreliable in detecting the actual resin level since the water column within the drum is not typically indicative of the resin volume. A determination of the resin level in the drums indirectly by sensing resin fill data in the spent resin tank has not been readily feasible either, because of similar difficulties in determining or maintaining an inventory of resin volume within the spent resin storage tank.

SUMMARY OF THE INVENTION

It is an object of the invention to provide an improved charging system of the above-outlined type with which the fill level of solids in the drum undergoing charging is reliably determined and which, upon such determination, automatically shuts off material delivery to the full drum and continues delivery to a standby empty drum.

This object and others to become apparent as the specification progresses, are accomplished by the invention, according to which, briefly stated, the system for continuously charging containers with a flowable substance including solid material, has a first pipe, a flow sensor for detecting substance flow in the first pipe; a plurality of valved second pipes each communicating with the first pipe and extending into a respective container; a level sensor associated with each second pipe for directly responding to a predetermined height level of the solid material accumulating in each respective container; and a control arrangement connected to the flow sensor, the level sensors and the valves of the second pipes for shutting off the valve of that second pipe through which charging was in progress and simultaneously opening the valve of another second pipe which is associated with an empty, standby container, at the moment when the level sensor associated with the container undergoing charging indicates that the solids reached the "full" level, while, at the same time, the flow sensor continues to indicate substance flow.

DESCRIPTION OF THE PREFERRED EMBODIMENT

Figure 1:
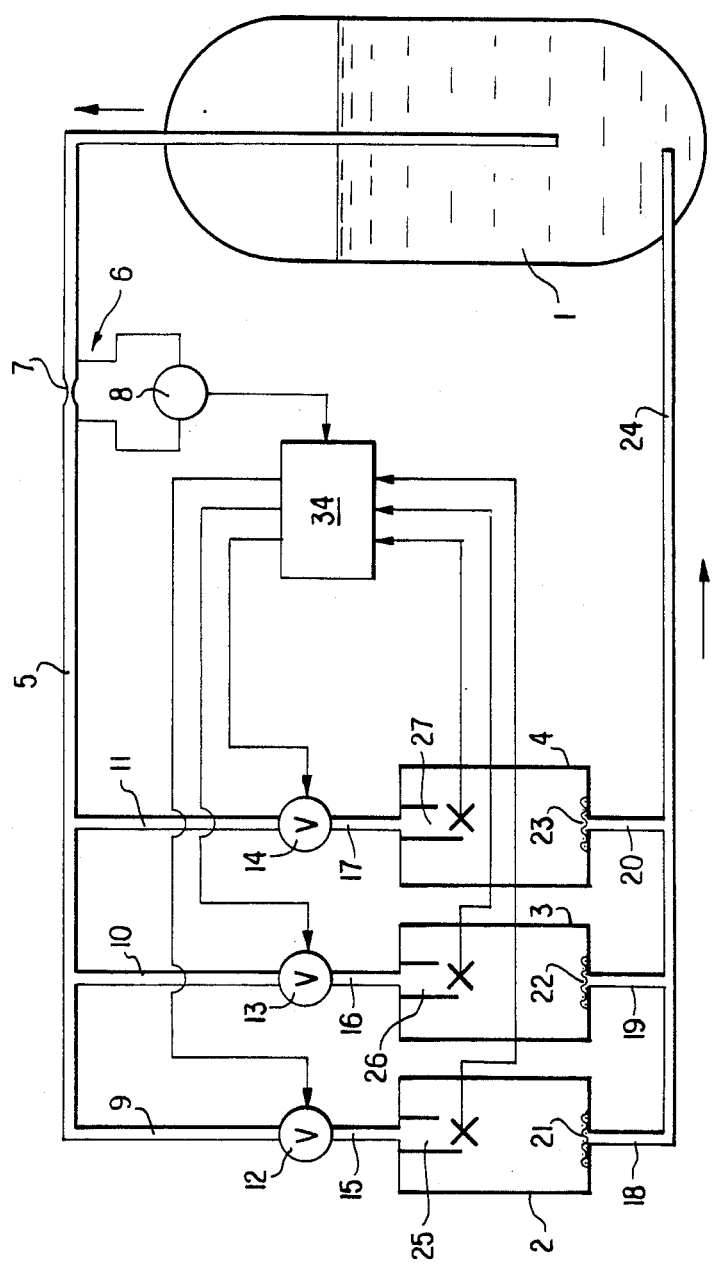
FIG. 1 is diagrammatic view of a preferred embodiment of the invention.

Turning to FIG. 1, solids such as contaminated (spent) resin used to remove cations and anions from a reactor coolant system is collected in a spent resin tank 1 in which it is mixed with water to form a water-resin slurry.

The transfer charging system according to the preferred embodiment is designed to be connected simultaneously to three drums 2, 3 and 4.

The water-resin slurry is withdrawn from the tank 1 through a feed pipe 5 by a slurry pump (not shown) or by pressurizing the tank 1. The feed pipe 5 contains a flow sensor assembly 6 which comprises a constriction 7 in the feed pipe 5 and a flow signal transmitter 8 adapted to emit a signal representing slurry flow if it detects a pressure difference across the constriction 7.

Downstream of the flow sensor assembly 6 (as viewed in the direction of slurry flow) pipe branches 9, 10 and 11 extend from the feed pipe 5. The pipe branches 9, 10, 11 are controlled by respective solenoid isolation valves 12, 13 and 14. Downstream of the isolation valves 12, 13 and 14 the pipe branches 9, 10 and 11 terminate in respective drum inlet pipes 15, 16 and 17 attached fluidtight to the respective drums 2, 3 and 4.

From each drum 2, 3 and 4 there extends a respective return pipe 18, 19 and 20 equipped with a resin retention screen 21, 22 and 23 to return the water from the resin-water slurry, for example, to the spent resin tank 1 by a collecting pipe 24.

Each drum inlet pipe 15, 16 and 17 carries a level sensor assembly 25, 26 and 27 within the respective drum 2, 3 and 4.

Figure 2:
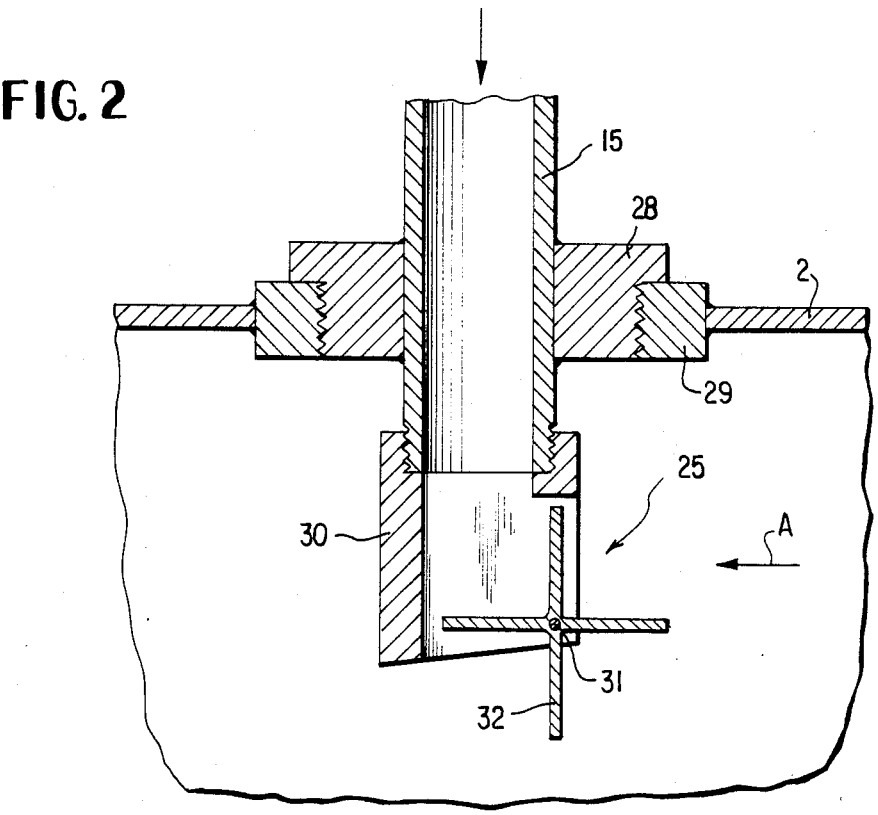
FIG. 2 is an axial sectional view of a component forming part of the preferred embodiment.
Figure 3:
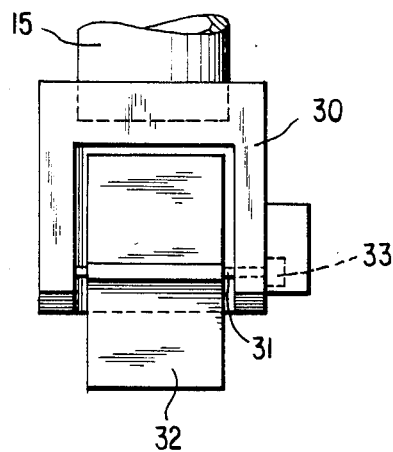
FIG. 3 is an elevational view in the direction of arrow A of FIG. 2.

Also referring now to FIGS. 2 and 3, the level sensor assemblies 25, 26 and 27 will be described in detail. The assemblies 25, 26 and 27 are of identical construction and therefore only the level sensor assembly 25 will be referred to in the description which follows.

The drum inlet pipe 15 is surrounded by an externally threaded coupling flange 28 which is screwed into a port ring 29 welded to an end wall of the drum 2. The drum inlet pipe 15 projects into the drum 2 through the coupling flange 28 and carries at its end, that is, at its charging outlet, the level sensor assembly 25. The latter comprises a sensor housing 30 directly attached (for example, by a threaded connection) to the drum inlet pipe 15. The housing 30 is a sleeve-like component which is open on opposite ends and which supports a rotary shaft 31 of a four-vane turbine 32. The turbine 32 is of lightweight construction and is arranged in the flow path of the slurry passing through the drum inlet pipe 15 and the housing 30 into the drum 2.

The housing 30 supports a magnetic rpm sensor 33 which is of conventional construction and which generates a signal when the turbine 32 rotates.

A rotation of the turbine 32 occurs as the slurry stream, during the charging process, collides with the turbine vanes which project into the flow path of the slurry. During the charging process the drum 2 is gradually filled with resin while the water of the slurry is withdrawn through the resin retention screen 21, the return pipe 18 and the collecting pipe 24.

The solid resin, as its level rises in the drum 2, projects into the travelling path of the vanes of the turbine 32, causing the latter to stop promptly because of its low inertia due to its lightweight construction. As a result, signal emission by the rpm sensor 33 stops. Between the turbine 32 and the inner wall of the housing 30 a sufficient clearance is provided to prevent resin backup into inlet piping 15 and furthermore to provide for a continued slurry inflow. Thus, the blockage of the turbine 32 does not stop the continuing inflow of the slurry. The loss of signal at the output of the rpm sensor 33 triggers a shutoff of the isolation valve 12 and the opening of isolation valve 13 or 14 as will be described later in connection with FIG. 4.

After the charging of the drum 2 is completed, that is, the resin therein has reached a desired height level and the system has shut off the isolation valve 12, the coupling flange 28 is unscrewed from the port ring 29, and the inlet pipe 15, together with the level sensor assembly 25, is lifted out of the drum 2, the port ring 29 is permanently sealed, and the drum 2 is removed for disposal. The level sensor assembly 25 may be re-utilized or it may be of the disposable type and is thus allowed to remain permanently within the filled drum 2.

Thus, by virtue of the use of the level sensor assemblies 25, 26, 27 it is reliably indicated when the solid material in the drum has reached a certain level predetermined by the intentional positioning of the turbine 32 at a desired height level at which the rising solids in the drum will cause stoppage of the turbine 32 and thus a cessation of the transmission of a flow signal by the rpm sensor 33.

The flow signal transmitter 8 of the flow sensor assembly 6 and the rpm sensor 33 of each level sensor assembly 25, 26 and 27 are connected to inputs of a control logic 34 whose outputs are connected to the solenoid-operated isolation valves 12, 13 and 14. The control logic 34, as will be described in detail with reference to FIG. 4, shuts off the isolation valve for the respective drum upon the latter attaining its filled state and opens another isolation valve, associated with an empty drum, for a continuous, uninterrupted transfer of slurry from the spent resin tank 1 into the final disposal drums 2, 3, 4.

Figure 4:
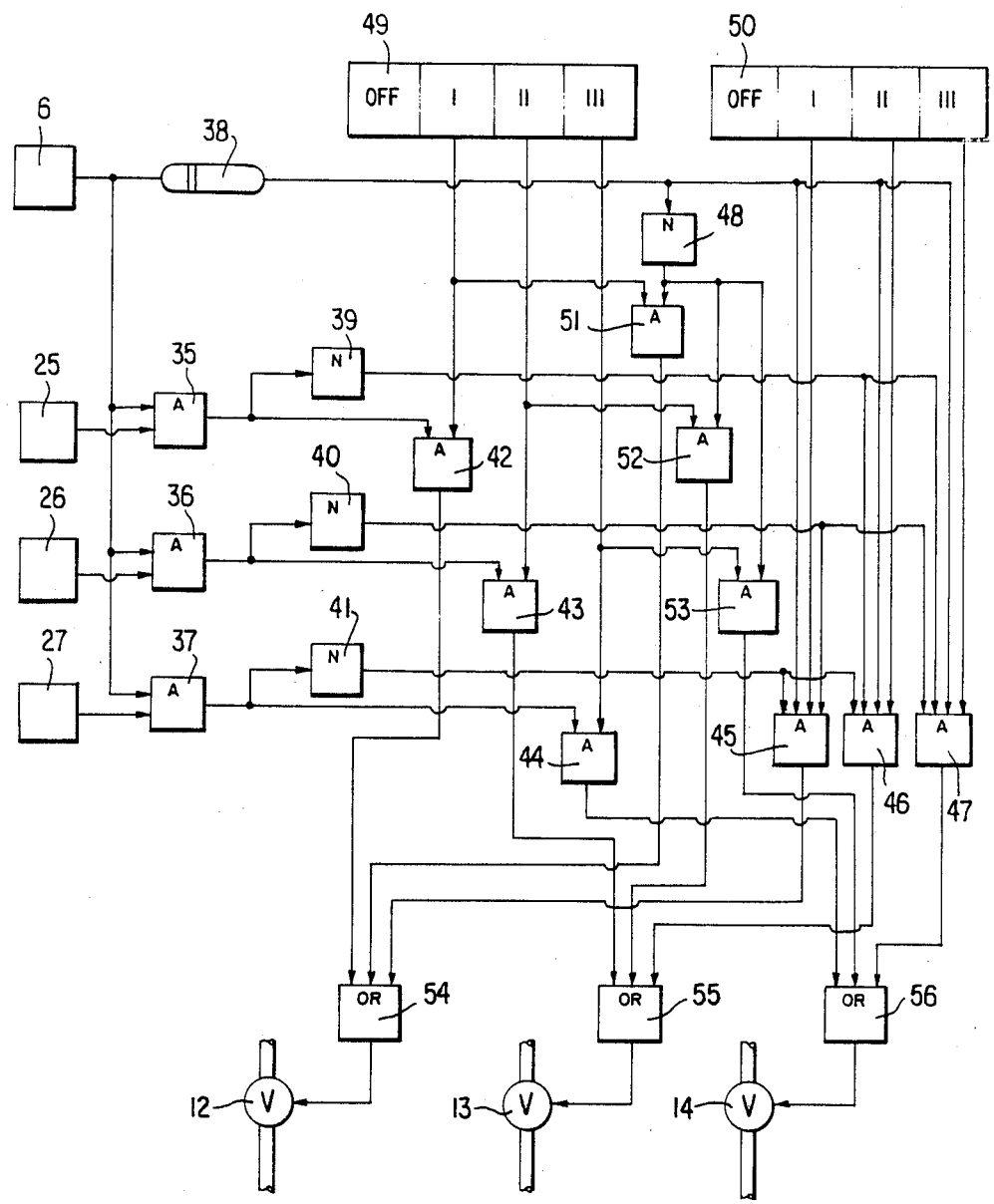
FIG. 4 is a block diagram of a control logic forming part of the preferred embodiment.

Turning now to FIG. 4, the output of the flow sensor assembly 6 is connected to an input of AND gates 35, 36 and 37 as well as to the input of a time delay component 38. The signal output of the level sensor assemblies 25, 26 and 27 is connected to the respective other input of the AND gates 35, 36 and 37. The output of the AND gates 35, 36 and 37 is connected to the input of respective inverters 39, 40 and 41 and to an input of AND gates 42, 43 and 44.

The output of the time delay 38 is connected to an input of AND gates 45, 46, 47 and an inverter 48.

The output of the inverter 39 is connected to an input of the AND gates 46 and 47; the output of the inverter 40 is connected to an input of the AND gates 45 and 47; and the output of the inverter 41 is connected to an input of the AND gates 45 and 46.

The control logic 34 further includes two four-position selector switches 49 and 50 each having an "off" position and a position associated with the three isolation valves 12 (position I), 13 (position II) and 14 (position III). By means of the two selector switches -as will be set forth in the operational description below - the momentarily working (charging) valve and the valve subsequently to be operational is chosen.

The position I of the selector switch 49 is connected to an input of the AND gate 42 and an AND gate 51. The position II of the selector switch 49 is connected to an input of the AND gate 43 and an AND gate 52. The position III of the selector switch 49 is connected to an input of the AND gate 44 and an AND gate 53.

The positions I, II and III of the selector switch 50 are connected to an input of the AND gates 45, 46 and 47, respectively.

The output of the converter 48 is connected to an input of the AND gates 51, 52 and 53.

Inputs of an OR gate 54 are connected with the respective outputs of AND gates 42, 45 and 51; inputs of an OR gate 55 are connected with the respective outputs of AND gates 43, 46 and 52; and inputs of an OR gate 56 are connected with the respective outputs of AND gates 44, 47 and 53.

The output of the OR gates 54, 55 and 56 is connected to the solenoid control (not shown) of the respective isolation valves 12, 13 and 14.

In the description which follows, the operation of the above-described control logic circuit 34 will be set forth.

It is assumed that at the start of the operation for transferring water-resin slurry from the spent resin tank 1 into drums 2, 3 and 4 connected to the system ready to receive material, the selector switch 49 is arbitrarily placed in position I and the standby selector switch 50 is arbitrarily placed in position II. This means that currently the drum 2 will be charged (that is, the drum which is associated with the position I on the selector switches 49, 50), while the subsequent drum to be charged will be the drum 3 (that is, the drum associated with the position II of the selector switches 49, 50).

An initial start of the flow in the feed pipe 5 generates a 1 signal in the sensor assembly 6. This signal is applied to the delay component 38 which continues to emit a 0 signal for a few seconds and, consequently, a 1 signal is applied by the inverter 48 to the AND gate 51. The other input of the AND gate 51 also receives a 1 from the position I of the selector switch 49 and consequently the OR gate 54 emits an energizing signal to the control solenoid of the isolation valve 12, maintaining the latter open to allow the slurry to flow into the drum 2.

After a few seconds, thus when the turbine 32 of the level sensor assembly 25 already rotates, the delay element 38 emits a 1 which causes the inverter 48 and thus the AND gate 51 to emit a 0. By virtue of the rotation of the turbine 32 of the level sensor assembly 25, however, the AND gate 35 emits a 1 which results in a 1 output of the AND gate 42, resulting in an energizing output signal of the OR gate 54. Thus, the solenoid of the isolation valve 12 continues to be energized and thus the valve 12 is maintained open and normal charging is in progress.

As the resin reaches the level of the turbine 32 of the level sensor assembly 25, the turbine stops and thus a 0 is applied to the input of the AND gate 35 resulting in a 0 output of the AND gate 42. Thus, all the inputs of the OR gate 54 receive a 0, resulting in a shutoff of the isolation valve 12, interrupting the flow into the drum 2. At the same time, however, because of a 0 output of the AND gate 35, the inverter 39 emits a 1 which is applied to one input of the AND gate 46. The latter has a 1 signal on each input, and thus, a 1 is applied to the OR gate 55 which, as a result, energizes the solenoid of the isolation valve 13 associated with the drum 3. It is seen that such a switch-over from the valve 12 to the valve 13 is possible by virtue of the continuing slurry flow through the constriction 7, resulting in a 1 signal at an input of each AND gate 45, 46 and 47.

As charging of the drum 3 commences, the turbine 32 of the level sensor assembly 26 starts to rotate. This, however, will not change any signal at any of the inputs of the OR gates 54, 55 or 56 and thus the isolation valve 13 continues to be maintained open.

The automatic switch-over from valve 12 to valve 13 may trigger an alarm to remind an operating person to reset the switches 49, 50. Thus, during the normal charging of the drum 3 the selector switch 49 is reset to position II while the standby selector switch 50 is reset to position III. It may be observed from FIG. 4 that is such a setting solely the valve 13 continues to be maintained open and that, upon stoppage of the turbine 32 of the level sensor assembly 26 for the reason that the resin level has reached the turbine in the drum 3, the isolation valve 13 is shut off and simultaneously, the isolation valve 14 is opened (all inputs of the AND gate 47 receive a 1 and thus one input of the OR gate 56 also receives a 1, resulting in an energization of the solenoid of the isolation valve 14).

The above-described system to which three drums may be attached simultaneously provides for sufficient time to remove the full drum and substitute an empty drum therefor.

The above-described specific control logic is but an example of a charge control according to the invention and, accordingly, a great number of other control logics may be designed, including circuits which may dispense with selector switches.

It will be understood that the above description of the present invention is susceptible to various modifications, changes and adaptations, and the same are intended to be comprehended within the meaning and range of equivalents of the appended claims.

What is claimed is:

1. A system for continuously charging containers of definite capacity with a flowable substance including solid material adapted to accumulate in the containers and a carrier liquid, comprising
   (a) a first pipe;
   (b) flow sensor means for detecting substance flow in said first pipe and for generating a first signal value representing a state of substance flow through said first pipe;
   (c) a plurality of second pipes each communicating with said first pipe and arranged for receiving substance from said first pipe; each said second pipe having a charging outlet;
   (d) a separate isolation valve in each said second pipe for allowing or blocking a flow of substance therein;
   (e) means for removably attaching a separate container to the charging outlet of each said second pipe;
   (f) means for removing the carrier liquid from each of the containers while accumulating the solid material therein;
   (g) a separate level sensor means associated with each said second pipe for directly responding to a predetermined height level of the solid material accumulating in each respective container and for generating a second signal value when the solid material reaches said height level; and
   (h) control means, connected to said flow sensor means, said level sensor means and said isolation valves for maintaining the isolation valve of one of said second pipes open and that of another of said second pipes closed during generation of said first signal value and in a simultaneous absence of said second signal value from the level sensor means associated with said one second pipe and for shutting off the isolation valve of said one second pipe and simultaneously opening the isolation valve of said other second pipe during generation of said first signal value and upon commencing emission of said second signal value by the level sensor means associated with said one second pipe.

2. A system as defined in claim 1, wherein said control means comprises control logic including a first selector switch means for arbitrarily selecting said one second pipe and a second selector switch means for arbitrarily selecting said other second pipe.

3. A system as defined in claim 1, further comprising draining and screening means for removing the carrier liquid from the containers while retaining the solid material therein.

4. A system as defined in claim 1, wherein said flow sensor means comprises a constriction in said first pipe and a flow signal transmitting means for generating said first signal value upon detecting a pressure difference in said first pipe on opposite sides of said constriction.

5. A system as defined in claim 1, wherein at least one level sensor means comprises a turbine rotatably supported at the charging outlet of a respective said second pipe; said turbine being arranged in a flow path defined by said respective second pipe for normally effecting rotation of said turbine in response to substance flow from the respective second pipe into the container attached thereto; said one level sensor means further comprising an rpm sensor means for generating a signal in response to a rotation of the turbine and for generating a zero signal in response to a standstill of the turbine; said zero signal being said second signal value; said turbine being prevented from rotating by the solid material upon its accumulation in the container to a level reaching said turbine.

6. A system as defined in claim 5, wherein said means for removing the carrier liquid from the containers while accumulating the solid material therein includes draining and screening means; said turbine being arranged at a sufficient clearance from inner walls of the respective second pipe to prevent solid material from backing up in the respective second pipe and to allow introduction of slurry into the container in an arrested state of said turbine.

* * * * *